Jan. 10, 1950     R. T. EVANS ET AL     2,494,381
ELEVATIONAL CONTROL MEANS FOR TANDEM DISK HARROWS
Filed April 25, 1944     3 Sheets-Sheet 1

INVENTORS
RUSSELL T. EVANS
JOHN H. CLASEN
BY HARRIS, KIECH, FOSTER & HARRIS
FOR THE FIRM
ATTORNEYS

Jan. 10, 1950     R. T. EVANS ET AL     2,494,381
ELEVATIONAL CONTROL MEANS FOR TANDEM DISK HARROWS
Filed April 25, 1944     3 Sheets-Sheet 2
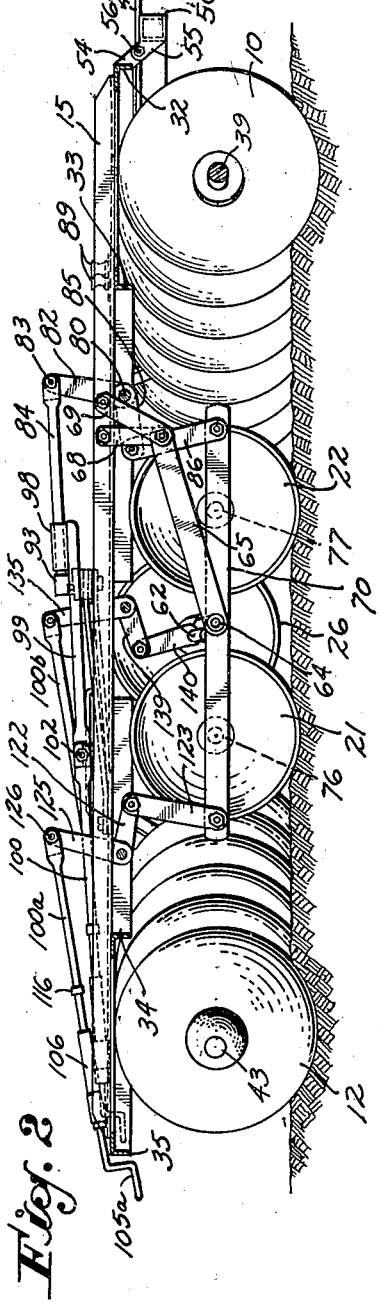
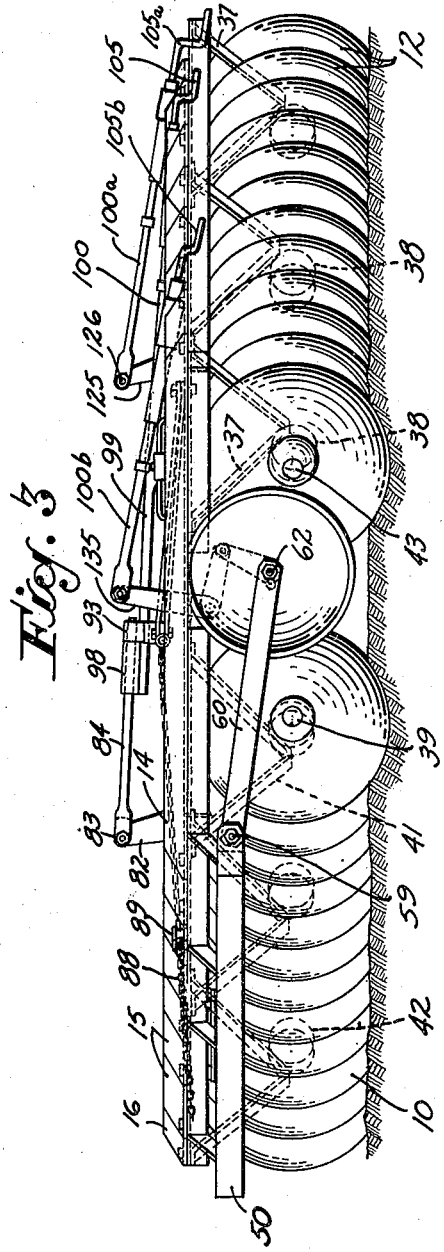
INVENTORS
RUSSELL T. EVANS
JOHN H. CLASEN
BY
HARRIS, KIECH, FOSTER & HARRIS
ATTORNEYS

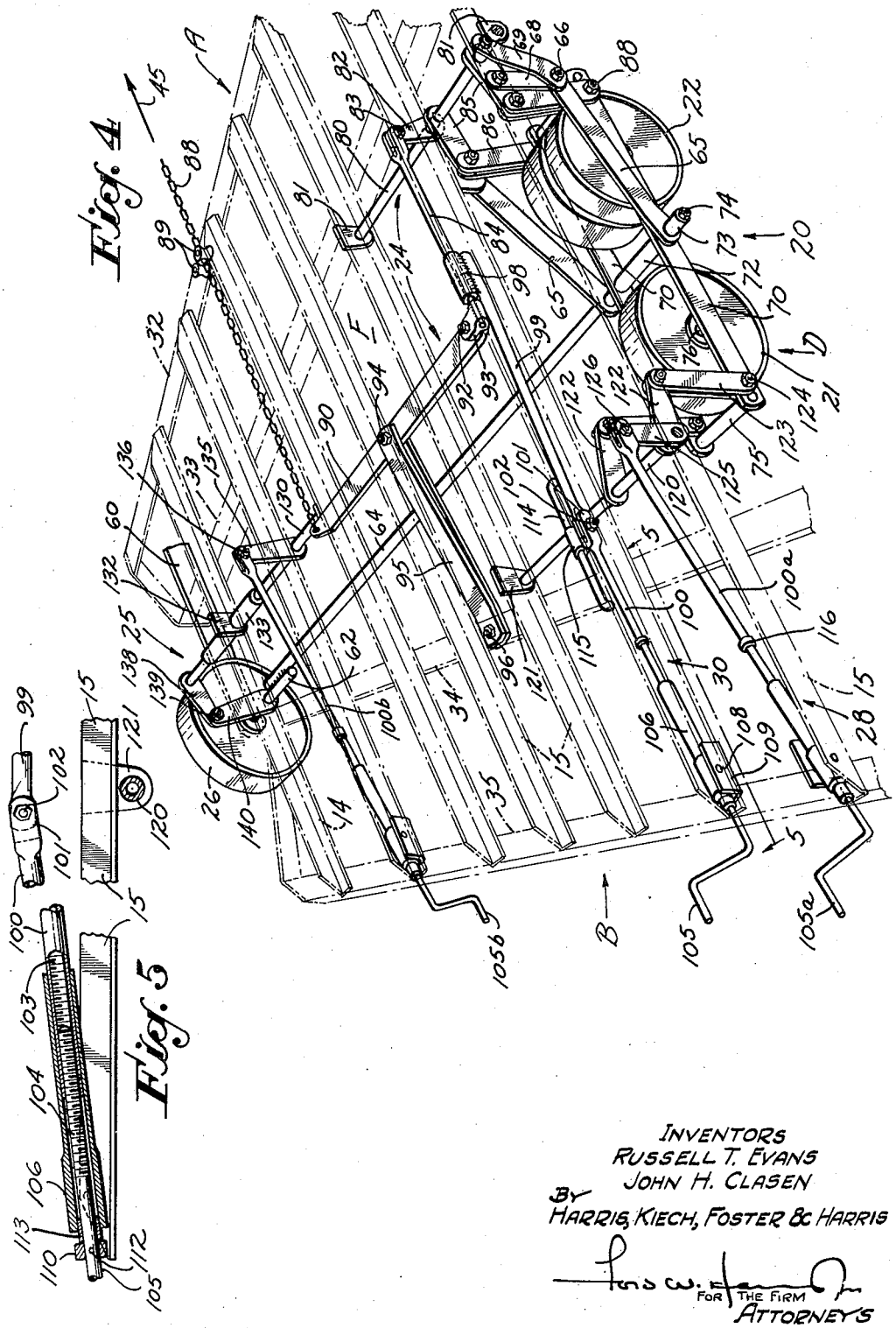

Patented Jan. 10, 1950

2,494,381

UNITED STATES PATENT OFFICE 2,494,381

ELEVATIONAL CONTROL MEANS FOR TANDEM DISK HARROWS

Russell T. Evans and John H. Clasen, Anaheim, Calif., assignors to J. I. Case Company, Racine, Wis., a corporation of Wisconsin Application April 25, 1944, Serial No. 532,575

14 Claims. (Cl. 55—73)

This invention relates to cultivating tools, and has special reference to harrows particularly of the improved offset type of disk harrow.

A general object of the invention is to improve cultivating implements, such as those of the offset disk harrow type similar to that disclosed in the patent to Evans and Clasen 2,349,257, Serial No. 473,030, of which this application is a continuation in part, in order that the penetration of the disks or other cultivating tools into the earth may be more efficiently regulated and in order that such a type of harrow or similar implement may be more conveniently managed, this being especially true of heavy disk harrows.

In offset disk harrows, a front gang of disks is mounted on a common axis which is inclined at an acute angle to the direction of travel of the implement, and a rear gang of disks is mounted on a common axis which is oppositely inclined to the line of travel so that the two axes tend to converge at one side of the harrow. In operation the two gangs of disks set up a strong tendency for the harrow to swing about a center point, which tendency is resisted by a hitch mechanism connecting the front end of the harrow to a tractor or other pulling device. In this type of harrow, a ground wheel is provided at each of the opposite sides of the harrow, and these wheels are mounted so that they may be vertically adjusted relative to the disks in order to vary the penetration of the disks into the soil being cultivated.

A particular object of the present invention is to provide a novel, efficient control for adjusting the vertical spacing of the ground wheels with relation to the main frame of an implement of the disk harrow type in order to vary penetration of the disks or other cultivating tools into the soil, and to elevate the disks or other tools above the surface of the soil for purposes of turning the harrow or transporting the harrow from one location to another. Another object and feature of the invention resides in employing a ground wheel on one side of the harrow and a pair of ground wheels on the other side of the harrow, whereby three points of support are provided, and so mounting these ground wheels that they may be independently adjusted to vary the amount of penetration of the soil by the various disks. Another object and feature of this invention is to provide means for adjusting a forward ground wheel with respect to the other ground wheels so that a forward corner of the implement may be lifted to elevate adjacent disks to a position to clear the soil, as for turning the implement. According to a preferred form of this invention, it is a further object and feature of the invention to provide means whereby the driver of a tractive device may independently change the vertical spacing of the forward ground wheel with respect to the frame to elevate the wheel disks farthest forward while turning the harrow toward that side on which the foremost disks are located, which commonly is the right side of the harrow.

Another object of the invention is to provide means for adjusting the wheels on one side of the harrow with respect to a wheel or wheels on the other side of the harrow so that the harrow may be tipped from one side to the other or from one corner to another in order to shift the weight of the harrow correspondingly and thereby provide for moving soil loosened by the disks in order to tend to change ground contours by gradual shifting of the soil by repeated cultivations.

An important feature of the invention resides in providing, on one side of the harrow between the diverging ends of the two gangs of disks, an adjustable frame or carriage in which spaced ground wheels are disposed longitudinally of the direction of travel, means being provided to raise and lower the opposite ends of the carriage and the corresponding ground wheels independently for corresponding adjustment of the disks relative to a main frame; and in a preferred form the adjusting means for the carriage includes additional means operable by the driver of a tractor to adjust one of the wheels independently of the other, whereby an adjacent corner of the harrow may be vertically adjusted and thereby vary the position of various disks.

Inasmuch as the gangs of disks and the main framework which supports them are moved relative to the ground wheels as the means for adjusting the ground wheels are moved, such adjustment may be considered as being either an adjustment of the ground wheels or an adjustment of the gangs of disks and the framework by which they are carried. Similarly, the resultant relative movement of the framework supporting the disks may be considered as a tilting or tipping of the harrow with respect to the ground wheels, even though the harrow frame might remain in a position substantially parallel to the soil being cultivated. In this description either view of the relative adjustment of the parts may be taken. Further, for convenience of description, the side of the harrow and the framework where the two gangs of disks tend to converge will be referred to as the "land side," because the natural cultivation progression over a field being harrowed is toward undisturbed soil; and the opposite side of the harrow will be referred to as the "furrow side," inasmuch as that side is adjacent land already cultivated or furrowed. For further convenience, especially in referring to turning movements, the land side, or side toward which the gangs of disks tend to converge, will be referred to as the "left side," and the furrow side, or the side toward which the gangs of disks diverge, will be referred to as the "right side."

Other objects and advantages of the invention will be apparent from the following description considered in conjunction with the accompanying drawings. In the drawings, which are merely illustrative of certain embodiments of the invention, Fig. 1 is a plan view of a disk harrow embodying the present invention;

Fig. 2 is principally a side elevation as indicated by the line 2—2, of Fig. 1, the nearer portions of the framework being broken away;

Fig. 3 is a side elevation from the opposite side of that of Fig. 2, as indicated by the line 3—3 of Fig. 1;

Figure 1:
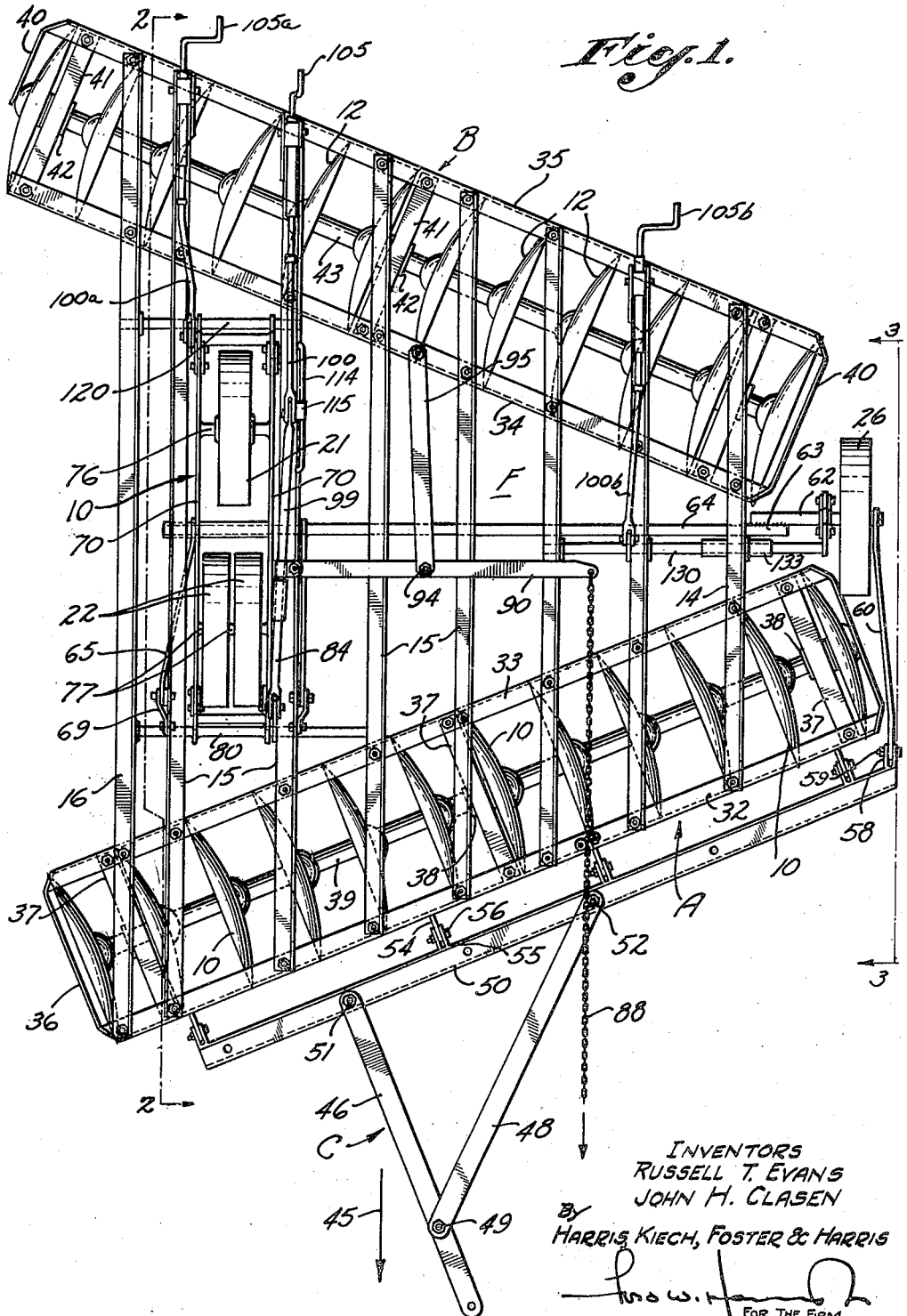

Fig. 4 is a skeletonized fragmentary perspective view showing the disk adjusting and regulating mechanism in full lines and the supporting framework in dot-and-dash lines; and Fig. 5 is a detail partly in section and partly in elevation of a portion of one of the means employed for adjusting the relative position of the means carrying the ground wheels, this view being taken approximately from the line 5—5 of Fig. 4.

The harrow illustrated in the drawings includes as its principal parts: a horizontally disposed main framework F which comprises a front gang frame A carrying forward disks 10, a rear gang frame B carrying rear disks 12, and a plurality of parallel connecting bars 14, 15 and 16 in the form of angle irons extending longitudinally of the direction of travel of the harrow; a hitch frame C; and a depth regulating and disk adjusting mechanism D which is shown in full lines in Fig. 4 and comprises principally a wheel positioning frame or carriage 20 carrying a rear furrow side wheel 21 and a pair of forward furrow-side transport wheels 22 which may be considered as a single wheel, accompanying regulating and lifting mechanism 24 connected with the forward end of the carriage 20 to lift the leading corner of the main frame F, individual disk adjusting mechanism 25 for a land side wheel 26, and individual disk adjusting mechanism 28 and 30, respectively, for the wheel 21 and the wheels 22.

The front gang frame A comprises forward and rear parallel side rails 32 and 33 of angle iron construction, and the rear gang frame B comprises forward and rear parallel side rails 34 and 35 of angle iron construction, to all of which side rails the connecting bars 14, 15 and 16 are rigidly secured to complete with the gang frames A and B a rigid main framework supporting the disks 10 and 12 and other operating mechanism in properly spaced relation, the main frame being normally horizontally disposed.

The front gang frame A is provided with end bars 36 and also with a plurality of supporting brackets 37 secured to the side rails 32 and 33 and carrying bearings 38 which receive and support a gang rod-assembly 39 carrying the forward disks 10. Similarly, the gang frame B is provided with end bars 40 and with bearing support brackets 41 which are secured to the side rails 34 and 35 and carry bearings 42 which receive and support a gang rod-assembly 43 for the disks 12.

The front gang frame A and the rear gang frame B and their respective disk assemblies 10 and 12 are characteristically disposed angularly with respect to each other so that they converge toward the land side wheel 26, this relationship being maintained by the shorter connecting bar 14 on the land side of the main framework, the intermediate connecting bars 15 which have progressively increasing lengths and the long connecting bar 16 on the furrow side of the harrow. Thus, as shown, the disks 10 are set to turn the earth toward the right of the direction of travel of the harrow, which direction is indicated by the arrow 45 in Figs. 1 and 4, that is, away from the land side wheel 26 toward the furrow side wheels 21 and 22. The disks 12 and the rear gang frame B are set to turn the earth toward the left side of the direction of travel or toward the land side. The land side disk of the front disks 10 is so positioned forwardly of the land side wheel 26 that the wheel 26 travels on the relatively compact earth at the bottom of a furrow formed by that disk 10, while the furrow side wheels 21 and 22 travel in a furrow cut by a disk 10 directly ahead of the wheels 21 and 22 into which furrow an adjacent disk 10 has thrown only a relatively small amount of freshly loosened earth, and into which loose earth the wheels 21 and 22 sink to different extents according to the character of the soil. This sinking, however, is minimized to an important degree by reason of the employment of the two transport wheels 22 side by side, thereby to provide a broad bearing surface such as would be furnished by a single wheel having a broad tread. For the purposes of this description the two wheels 22 may be viewed as a single broad treaded wheel.

The combined influences of the two gangs of disks 10 and 12 tend to swing the harrow toward the land side wheel 26, that is, to the left, as the harrow is drawn forward. This tendency of the harrow to swing is resisted by the hitch mechanism C shown in Fig. 1 which is hingedly secured to the front gang frame A and comprises a forwardly extending hitch bar 46 to be pivotally attached to a tractor in a well known manner, a brace bar 48 secured at its forward end to the hitch bar 46 as shown at 49, and a cross bar 50 which parallels the side rail 32 of the front gang frame A and is connected at 51 and 52 to the rear ends of the bars 46 and 48, respectively. The cross bar 50, which may be two angle irons so disposed as to form a hollow structure square in cross section, is hinged to the rail 32 by means of a plurality of spaced brackets 54 on the rail 32 pivotally mounted between corresponding spaced pairs of ears 55 on the bar 50 as indicated as 56. The land side end of the cross bar 50 also carries a pair of ears 58 hingedly connected at 59 to one end of a radius bar 60 whose other end is secured upon and longitudinally positions the outer end of a stub axle 62 on which is mounted the land side ground wheel 26. The stub axle 62 is welded at 63 to a cross shaft 64 with respect to which it is thereby offset. The shaft 64 extends transversely across the middle of the harrow to the opposite side where it provides a mounting upon which the wheel carriage 20 rocks. The right or furrow-side end of the shaft 64 and the carriage 20 are positioned longitudinally of the harrow by means of radius arms or bars 65 pivotally connected at 66 on the converging lower ends of respective pairs of positioning links 68 and 69 whose upper ends are secured in spaced relation to the adjacent connecting bars 15 of the main framework. The rocking of the carriage 20 upon the shaft 64 is accomplished by extending the shaft 64 through two parallel spaced bars 70 which form the opposite sides of the carriage 20. As shown, the spaced relationship of the arms 70 is maintained by means of a sleeve 72 mounted upon the shaft 64 between the arms 70, and the outer radius arm 65 is retained in position against the outer arm 70 by means of a short sleeve 73 and a nut 74 on the corresponding outer end of the shaft 64. In this manner, the shaft 64 constitutes a floating shaft which, in itself, has no fixed connection with the main framework F. The ends of the carriage 20 are formed by rods 75 welded or otherwise fixed to the ends of the bars 70 to maintain the latter in properly spaced relation. The furrow side wheel 21 and the transport wheels 22 are mounted in the carriage 20 between the bars 70 on short axles 76 and 77, respectively, whereby the wheels 21 and 22 support the carriage 20 and the shaft 64.

In addition to positioning the carriage 20 with respect to the main framework F through the medium of the radius arms 65 and the links 68 and 69, the forward end of the carriage 20 is adjustably connected with the main frame by the regulating mechanism 24 and the depth adjusting mechanism 30 which provide for vertically adjusting the wheels 22 with respect to the main frame, and the rear end of the carriage 20 is adjustably connected with the main frame for adjustment of the wheel 21 with respect to the main frame through the medium of the adjusting mechanism 28.

The mechanism 24 comprises a rock shaft 80 mounted in brackets 81 secured to adjacent connecting bars 15 and the furrow side connecting bar 16. Rigidly secured to the rock shaft 80 is an actuating or control arm 82 pivotally connected at 83 to an actuating drag link 84. Also secured to the rock shaft 80 are short arms 85 each of which is pivotally connected with a pair of spaced links 86 pivotally secured at 88 to the forward ends of the side bars 70 of the carriage 20. Upon draft by the drag link 84, the arms 82 and 85 act in the nature of a bell crank to force the links 86 and the adjacent end of the carriage 20 downward with respect to the main frame thereby to lift the leading corner of the frame by increasing the vertical spacing between the wheels 22 and the adjacent connecting bars 15 and 16 constituting the furrow side of the main frame. The drag link 84 forms a part of the lifting mechanism 24 which is adapted for actuation by the driver of a tractor or other device pulling the harrow, and includes also a flexible draft device such as a chain 88 which is connected at the left side of the rear of the tractor according to a well known arrangement, and extends rearward therefrom between a pair of concave rollers 89 to connect with one end of a lever 90, to the other end of which is fixedly secured at 92 a stop lug 93 in which the rear end of the drag link 84 is welded or otherwise fixed. An intermediate portion of the lever 90 is fulcrumed at 94 to a supporting arm 95 whose rear end is bolted at 96 to the forward rail 34 of the gang frame B. Thus, when the tractor is turned toward the right and the harrow hitch 46 swings to the right in following the tractor, the connection of the chain 88 at the left of the tractor causes the chain to be pulled automatically and thereby swing the lever 90, and draw the drag link 84 rearward to move the forward end of the carriage 20 and the wheels 22 vertically downward with respect to the adjacent connecting bars 15 and 16 of the harrow frame, whereby to lift the most forward corner of the frame. When the tractor turns back toward the left and the harrow again trails directly behind, the draft on the chain 88 is relieved and the weight of the harrow automatically restores the position of the parts. The return of the lifting mechanism 24 to its original position is limited by means of a stop sleeve 98 through which the drag link 84 slides, this mounting thereby providing a lost motion connection. The sleeve 98 is welded to the forward end of a reach rod member 99 whose rear end is hingedly joined to a tubular reach member 100 between bifurcations 101 thereof by means of a hinge pin 102. The rear end of the tubular rod member 100 is internally threaded at 103 and receives the threaded end 104 of a hand crank 105. The threaded end of the member 100 projects into a sheath 106 which is pivotally carried on the main frame as by means of trunnions 108 mounted in the rear end of one web of the adjacent connecting bar 15 and in a short bracket 109 secured to such connecting bar 15. The hand crank 105 has a bearing hub or collar 110 secured thereto as by means of a pin 112, the collar 110 working against the adjacent end of the sleeve 106 and a bushing 113 carried therein.

By manipulation of the hand crank 105 so that its threaded portion 104 is fed into and out of the threaded portion 103 of the rod member 100, the effective length of the reach rod 99, 100 is varied and the stop sleeve 98 on the forward end of the reach rod member 99 is adjusted to adjust the position at which the stop lug 93 on the lever 90 strikes the stop sleeve 98 in returning to normal operating position, and at which the lug 93 bears upon the stop sleeve 98 during normal operation of the harrow. The sleeve 98 thereby limits forward movement of the drag link 84, which in turn limits the lowering of the adjacent disks 10 and adjacent portions of the main frame with respect to the forward end of the carriage 20 and the transport wheels 22, whereby to establish a normal operating position. For the purpose of preventing vibration and buckling of the jointed reach rod 99, 100, a rod 114 is secured to the adjacent frame bar 15 and slidably receives an eye 115 secured to the hinge pin 102 or other part constituting an element of the joint. A stop collar 116 on rod member 100 is adapted to abut the end of the sheath 106 and limit the shortening of the effective length of the reach rod and corresponding lifting of the main frame and spacing thereof with respect to the wheels 22.

In a similar manner, the vertical spacing of the furrow wheel 21 with respect to the adjacent connecting bars 15 and 16 of the main frame may be adjusted by means of a rock shaft 120 mounted in brackets 121 secured to the adjacent connecting bars 15 and 16 of the main frame. Rigidly secured to the rock shaft 120 is a pair of arms 122 each of whose outer ends is pivotally connected between a pair of spaced links 123 which in turn are pivotally connected to the opposite sides of the respective side bar 70 of the carriage 20 as indicated at 124. Also fixedly secured to the rock shaft 120 is an upstanding control arm 125 whose position may be adjusted by means of a reach rod 100a whose forward end is bifurcated, as shown, to straddle the upper end of the arm 125 and is pivoted thereto as by means of a hinge bolt 126. Otherwise, the reach rod 100a has the same construction and mounting as the rod member 100 and is actuated to raise and lower the adjacent portion of the main frame through the medium of a hand crank 105a in the same way that the reach rod 100 is adjusted by hand crank 105.

For purposes of raising and lowering the land side of the main frame and the adjacent connecting bar 14 with respect to the land side wheel 26, the adjusting mechanism 25 is provided and actuated in the same manner as the adjusting mechanism 28 for the furrow side wheel 21. The mechanism 25 comprises a rock shaft 130 mounted in brackets 132 secured to the adjacent frame bars 14 and 15, the rock shaft 130 being prevented from shifting longitudinally by means of short sleeves 133 secured thereon at opposite sides of one of the brackets 132. The shaft 130 is rocked by means of an upstanding control arm 135 fixed thereon and a reach rod 100b whose forward end is provided with bifurcations pivoted to the upper end of the arm 135 as indicated at 136. The rod 100b has the same construction and mounting as the reach rods 100 and 100a, and is secured to an adjacent frame bar 15 in the same manner and operated by a hand crank 105b in the same way as indicated in Fig. 5. Fixedly secured on the outer end or land side end of the rock shaft 130 is an arm 138, whose swinging end is pivoted at 139 to a link 140 fixedly secured to the stub shaft 62 upon which the land side wheel 26 is carried. By operation of the hand crank 105b, the rod 100b is moved longitudinally and operates through the arm 135, the rock shaft 130, the arm 138 and the link 140, to raise and lower the adjacent portion of the main frame for positioning of the adjacent disks 10 and 12 of the gang frames A and B, either for proper penetration of the soil by the harrow or for transport from one location to another.

*Operation*

In operating the harrow herein disclosed, the forward end of the hitch arm 46 will be connected to a tractor or other pulling device for movement longitudinally of the harrow and in a direction indicated by the arrow 45, and the wheels 21, 22 and 26 will be adjusted through the medium of the hand cranks 105, 105a, and 105b to provide such spacing of these wheels with respect to the main frame carrying the disks 10 and 12 as will provide for proper penetration of the soil being cultivated. In normal operation, the land side disk 10 of the front gang forms a furrow in the bottom of which the land side wheel 26 travels, the land side edge of the wheel 26 tending to crowd against the land wall of this furrow. The transport wheels 22 at the furrow side, or right side, of the harrow travel on freshly disked soil and tend to pack the soil for travel thereover of the furrow side wheel 21. Assuming a normal disking operation in average soil, the wheels 21, 22 and 26 are set at an intermediate position with respect to the main frame and the disks 10 and 12, whereby the disks 10 and 12 penetrate the soil to a desired depth, the weight of the main frame and the disks being such as to insure such desired penetration.

In order to increase penetration of the disks into the soil as the soil varies, or where deeper penetration is desired, the carriage 20 carrying the wheels 21 and 22 may be adjusted relative to the main frame and the disks 10 and 12 carried thereby so that the vertical spacing between the carriage 20 and the main frame is reduced, thereby permitting the main frame to settle and cause the disks 10 and 12 to penetrate the soil more deeply. This adjustment is accomplished by rotating the hand crank 105 so as to lengthen the reach rod member 100 by means of the threaded connection between the internally threaded portion 103 of the tubular rod 100 and the screw threaded portion 104 of the crank 105. Such lengthening of the reach rod 99, 100 extends the stop sleeve 98 farther forward so that the drag link 84 and the stop lug 93 may move forward under the influence of the weight of the harrow by reason of the rocking of the rock shaft 80 and the arms 82 and 85 to permit relative elevation of the links 86 and the forward end of the carriage 20 together with the transport wheels 22. Such adjustment alone would cause lowering of the most forward portion of the harrow frame to cause deeper penetration of the soil by the disks 10 on the furrow side end of the front gang frame A. This positioning would result in a tilting of the harrow and could be employed in the event of its being desired to shift soil toward the furrow side.

To balance up the furrow side, or right side, of the harrow frame, the hand crank 105a would then be manipulated to shorten the reach rod 100a whereby to reduce the spacing between the main frame and the furrow wheel 21, this being a result of a rocking of the rock shaft 120 by the control arm 125 in a direction opposite to the motion of the rock shaft 80 just described, and permitting the relative elevation of the arms 122, the connecting links 123 and the rear end of the wheel carriage 20 together with the furrow wheel 21. With this adjustment of the furrow side wheel 21 and the transport wheels 22 with respect to the main frame of the harrow, without any adjustment of the land side wheel with respect to the land side of the main frame, the furrow side of the main frame will be leveled up with a resultant greater penetration into the soil by the furrow side disks 12, and less penetration of the furrow side disks 10 into the soil than when only the wheels 22 had been adjusted to lower the forward right corner of the main frame. With the adjustment of both the furrow side wheel 21 and the transport wheels 22, whereby the wheel carriage 20 is leveled with respect to the earth, the land side wheel 26, however, remaining unadjusted, the whole harrow frame is tilted toward the furrow side, or the right side, of the harrow as it travels forwardly, with a resultant corresponding shift in weight toward the furrow side which tends to shift the cultivated soil somewhat more toward the furrow side than where the harrow frame is level with respect to the soil surface.

Complete leveling of the main frame of the harrow to effect greater penetration of all of the disks 10 and 12 than before the adjustment of either the wheel 21 or the wheels 22, is effected by actuating the hand crank 105b to lengthen the reach rod 100b so that the control arm 135 will be moved and permit the shaft 130 to move and elevate the link 140, the stub shaft 62 and the land side wheel 26 with respect to the adjacent side of the main frame, thereby lowering the land side disks 10 and 12 for deeper penetration into the soil.

If the rear end of the wheel carriage 20 be adjusted to reduce the spacing between the furrow side wheel 21 and the harrow frame so that the penetration of the furrow side disks 12 on the rear gang frame B is greater than the penetration into the earth of the forward disks 10, there will be a tendency to shift the soil toward the land side.

Thus, by employment of the various adjusting means 30, 28 and 25, respectively, by manipulation of the hand cranks 105, 105a and 105b, the harrow frame and the disks 10 carried by the forward gang frame A and the disks 12 carried by the rear gang frame B may be raised and lowered for smaller or greater penetration of the disks into the soil as required, and, by variously adjusting the different adjusting means to tilt the main frame in various respects, the soil being cultivated may be gradually shifted to correct undesirable ground contours.

One of the important advantages gained by the present construction, is the elevation of the most forward disks 10 on the front gang frame A, that is, those disks 10 on the furrow side. This is accomplished by operation of the hand crank 105 to shorten the reach rod member 100 and rock the control arm 82 through the medium of the drag link 84 and the draft of the stop sleeve 98 against the stop lug 93 of the lifting mechanism 24, whereby to rock the shaft 80 and the actuating arms 85 and depress the links 86 and the forward end of the wheel carriage 20, together with the transport wheels 22, so as to increase the spacing between the wheels 22 and the harrow frame. The resultant elevation of the adjacent forward disks 10, will, in such circumstances, be sufficient to clear the disks from the soil and permit an easy right hand turn, that is, a turn toward the furrow side, without gouging of the adjacent forward disks 10 into the soil during the turning operation.

It will be noted that the present construction, which comprises the three separate rock shafts 80, 120 and 130, provides a three-point support for the harrow main frame, with the result that vertical adjustment of either the furrow side wheel 21 or the transport wheels 22 with respect to the other and with respect to the main frame, without corresponding adjustment of the other wheel, does not impart objectionable tilting to that portion of the frame beyond the wheel which is not adjusted. This has an important advantage, because, for example, when the forward furrow side disks 10 and the corresponding corner of the harrow frame are elevated to clear the soil for turning movement toward the right, the furrow side wheel 21 will tend to support the corner of the main frame behind it without depressing the furrow side disks 12 or the rear gang frame B and causing consequent soil penetration to as great an extent as would occur if only one furrow side supporting wheel were employed about which the harrow was tilted to cause the forward furrow side disks to clear the soil.

It will be seen that, by reason of the three points of support afforded by the wheels 21, 22 and 26, actuation of the lifting mechanism 24 to elevate the corner of the harrow frame that is farthest forward will cause the frame to tilt about an axis formed by the rear axle 76 and the stub axle 62. Although this action tends to force the rear disks 12 slightly deeper into the soil, nevertheless, upon making a turn toward the furrow side of the harrow, the disks 12 follow readily in view of their angular setting. However, the tendency of the furrow side disks 12 to penetrate more deeply into the soil when the forward corner of the harrow frame is lifted is in part overcome because the axis 76 of the rearward wheel 21 is mounted in the carriage 20 at an appreciable distance forward of the pivotal mounting of the carriage 20 upon the lower ends of the adjusting links 123. In view of this location of the wheel 21 somewhat forward of the pivot point 124, there will always occur a small amount of vertical adjustment of the wheel 21 with respect to the harrow frame whenever the forward wheels 22 are moved by adjustment of the forward end of the carriage 20. For example, in the arrangement shown, a given adjustment of the forward wheels 22 with respect to the harrow frame through the medium of the rock arm 80 would impart perhaps one-fourth as much vertical adjustment of the rear wheel 21 with respect to the harrow frame, so that when the forward corner of the harrow frame is elevated, the smaller relative adjustment of the rearward portion of the harrow frame prevents penetration into the soil as deep as would otherwise occur. Since the foremost disks 10 have been lifted clear of the soil, they do not resist the turning movement, and the resistance to turning which is imparted by the land side disks 10, which may not have been lifted entirely clear of the soil is relatively inconsequential.

The present construction thus has the advantage and convenience in that it permits relative adjustment of the wheels 21, 22 and 26 with respect to the harrow frame and the forward disks 10 and rearward disks 12 through the medium of the hand cranks 105, 105a and 105b, to insure a desired penetration of the disks into the soil being cultivated, and at the same time it provides for elevating the forward, furrow side corner of the harrow whenever it is desired to make a right hand turn, this being accomplished automatically by draft on the chain 88 to rock the lever 90 of the lifting mechanism 24 and raise the corresponding corner of the harrow until the turn has been made. The incidental necessary movement of the drag link 84 is permitted by its lost motion or sliding connection with the sleeve 98. The pull on the chain being then relieved, the parts automatically return to their normal operating position merely by reason of the weight of the harrow frame, this return movement to normal position being permitted by the mentioned lost motion connection and being controlled and limited by engagement of the stop lug 93 with the stop sleeve 98 sliding on the drag link 84.

While the present disclosure describes and illustrates a preferred form of the invention, it is not to be considered as limiting, and rights are reserved to all departures therefrom which fall within the scope of the appended claims.

We claim as our invention:

1. In combination in a harrow: a frame; a front gang of cultivating tools carried by said frame; a rear gang of cultivating tools carried by said frame; a ground wheel near one side of said frame; a pair of spaced forward and rearward ground wheels near the opposite side of said frame; a carriage pivotally carried by said frame, said forward ground wheel being mounted in said carriage; means connected with said carriage whereby to swing said carriage about its pivot and raise and lower said forward ground wheel; means mounting said rearward ground wheel in said carriage; and means carried by said frame for independently adjusting each of said ground wheels and respective portions of said carriage vertically with respect to said frame for varying the position of said cultivating tools with respect to soil being cultivated.

2. In combination in a harrow having a main frame carrying a forward gang and a rearward gang of cultivating tools and having hitch means for drawing the harrow forward: a ground wheel disposed near one side of said frame to support the same; a forward ground wheel and a rearward ground wheel adjacent the opposite side of said frame; a longitudinally extending carriage in opposite ends of which said forward and rearward ground wheels are mounted; means carried by said frame and connected with the forward end of said carriage for adjusting the vertical relationship between said forward ground wheel and said frame; and means carried by said frame and connected with the rear end of said carriage for adjusting the vertical relationship between said rearward ground wheel and said frame.

3. A combination according to claim 2 wherein means are connected with the forward ground wheel and said frame for lifting a forward portion of said frame independently of the adjustment produced by the first mentioned adjusting means.

4. A combination according to claim 2 wherein means for independently lifting a portion of said frame adjacent said forward ground wheel is connected by a lost motion connection to said adjusting means which is connected with the forward end of said carriage.

5. In combination in a harrow having a main frame carrying a front gang of disks inclined to the direction of travel of the harrow and a rear gang of disks inclined to the direction of travel of the harrow and converging toward one side: a ground wheel at the side of the harrow toward which said gangs converge; a rearward ground wheel at the opposite side of said harrow; a forward transport wheel at said opposite side of said harrow and spaced from said rearward ground wheel; an elongated carriage in which said rearward and foward wheels are mounted; means connecting the end of said carriage adjacent said rearward wheel to said frame; and means on said frame adjustably connected with the end of said carriage adjacent said forward wheel and adapted to adjust the relative spacing of the forward end of said carriage with respect to said frame.

6. A combination according to claim 5 wherein the means connecting the rearward end of said carriage with said frame is adapted for adjusting the vertical spacing of said rearward end of said carriage with respect to said frame.

7. A combination according to claim 5 wherein means is provided for lifting a forward portion of said frame with respect to said forward wheel independently of adjustment for normal spacing between said carriage and said frame by said means adjacent said forward wheel.

8. In combination in a harrow having a main frame carrying a front gang of disks inclined in the direction of travel of the harrow and a rear gang of disks inclined in the direction of travel of the harrow, said gangs converging toward one side: a ground wheel at the side of the harrow toward which said gangs converge; a rearward ground wheel at the opposite side of the harrow; a forward ground wheel at said opposite side of said harrow spaced from said rearward ground wheel; an elongated carriage in which said rearward and forward ground wheels are mounted; means pivotally connecting a rearward portion of said carriage to an adjacent portion of said harrow frame, said rearward ground wheel being disposed an appreciable distance forward of said pivotal connecting means; and means adjustably connecting the forward end of said carriage with said harrow frame for adjusting the relative spacing of said forward ground wheel with respect to said frame, whereby a limited amount of adjustment of said rearward ground wheel with respect to said harrow frame is produced when said forward ground wheel is adjusted with respect to said frame.

9. In combination in an implement having a main frame carrying front and rear gangs of cultivating tools, and having hitch means for drawing the implement forward: a first ground wheel on one side of said frame; a second ground wheel on the side of said frame opposite said first ground wheel; a forward transport wheel on said opposite side of said frame; a carriage mounted upon said opposite side of said frame, said second ground wheel and said transport wheel being journaled in said carriage in positions substantially fixed with respect to said carriage; means connected with said frame and said carriage for positively retaining said wheels and carriage in a normal operating position; and means connected with said frame and said carriage for moving said transport wheel to vary its vertical spacing with respect to said frame and hold it in such position.

10. A combination as in claim 9 including: a floating shaft upon which said carriage is mounted; and radius arms connected with said frame to position said carriage.

11. A combination as in claim 9 wherein said retaining means includes: rock shafts carried by said frame; linkages respectively connecting said rock shafts with opposite ends of said carriage; and means connected with said frame to control the positions of said rock shafts.

12. In a combination as in claim 9: a floating shaft upon which said first ground wheel and said carriage are mounted; radius rods connected with said frame and positioning the ends of said shaft; and means connected with said first ground wheel and the ends of said carriage for adjusting the positions of said wheels and positively maintaining said wheels in adjusted positions.

13. In combination in a cultivating implement having a main frame carrying cultivating tools, and having hitch means for drawing the implement forward: a first ground wheel on one side of said frame; a rearward ground wheel and a forward transport wheel on the side of said frame opposite from said first ground wheel; a carriage at said opposite side of said frame, said rearward ground wheel and forward transport wheel being mounted in opposite ends of the said carriage; and means connecting said opposite ends of said carriage with said main frame, said connecting means including means for varying the vertical spacing of one end of said carriage with respect to said main frame.

14. A combination as in claim 13 wherein the last named means includes means operable by the driver of a tractive vehicle to vary said spacing during movement of the tractive vehicle and the implement.

RUSSELL T. EVANS.
JOHN H. CLASEN.

REFERENCES CITED

The following references are of record in the file of this patent:

UNITED STATES PATENTS

| Number | Name | Date |
|---|---|---|
| 2,320,742 | Newkirk | June 1, 1943 |
| 2,349,257 | Evans | May 23, 1944 |
| 2,356,876 | Newkirk | Aug. 29, 1944 |